(No Model.)

E. A. PARKER.
SALT OR PEPPER HOLDER.

No. 507,720.  Patented Oct. 31, 1893.

WITNESSES
H. A. Lamb
Pearl Reynolds

INVENTOR
Edmund A. Parker
By
A. M. Wooster
Atty.

UNITED STATES PATENT OFFICE.

EDMUND A. PARKER, OF MERIDEN, CONNECTICUT.

SALT OR PEPPER HOLDER.

SPECIFICATION forming part of Letters Patent No. 507,720, dated October 31, 1893.

Application filed June 26, 1893. Serial No. 478,814. (No model.)

*To all whom it may concern:*

Be it known that I, EDMUND A. PARKER, a citizen of the United States, residing at Meriden, in the county of New Haven and State of Connecticut, have invented certain new and useful Improvements in Salt or Pepper Holders; and I do hereby declare the following to be a full, clear, and exact description of the invention, such as will enable others skilled in the art to which it appertains to make and use the same.

My invention has for its object to provide a salt or pepper holder which shall be simple and inexpensive to produce and which shall combine the advantages of salt or pepper holders made of glass or porcelain and having metallic caps, with the more elaborate and ornamental appearance of holders made entirely of metal. It is of course well understood that so far as the mere holding of the condiment, especially salt, is concerned, glass or porcelain is very much superior to metal on account of the tendency of metal to oxidize. Holders made of glass or porcelain however are not acceptacle to the higher class of trade which requires the more elaborate and ornamental effect of metallic holders.

In my improved holder I have combined the non-oxidizing properties of a glass or porcelain holder with the neat and attractive appearance of a metallic holder. This result I accomplish by the novel construction which I will now describe referring by numbers to the accompanying drawings forming part of this specification, in which—

Figure 1:
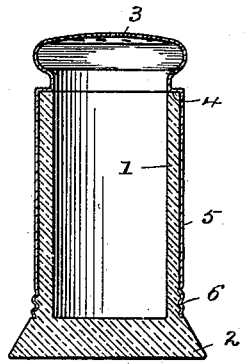
Figure 2:
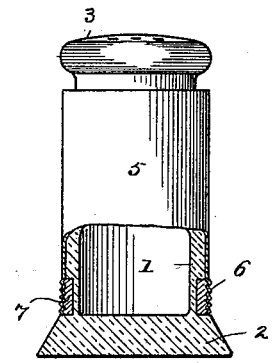

Figure 1 is a section illustrating one form in which I have carried my invention into effect. Fig. 2 is an elevation partly in section, Fig. 3 an elevation, and Fig. 4 is a section illustrating various changes in the details of construction.

1 denotes the body, the lower end of which is preferably enlarged more or less to form a base 2 upon which the holder rests.

3 denotes the top having the usual perforations through which the condiment passes out in use, and under which is a neck having a more or less abrupt shoulder 4.

5 denotes a case or cover which is preferably made integral with the top and which wholly incloses the body with the exception, if preferred, and as shown in the drawings, of the base 2. The case as well as the top is made of metal and is provided at its lower end with a screw thread 6 which is adapted to engage a corresponding screw thread at the lower end of the body. The body may be made of glass or porcelain, or if preferred of wood, the sole requirement for the purposes of my invention being that it be made of a non-oxidizable material. The threads in the body which are engaged by threads upon the case or cover may be pressed into, or otherwise formed in the material of the body as shown in Fig. 1, or a metallic ring 7 may be molded into the material of the body as shown in Fig. 2.

Figure 3:
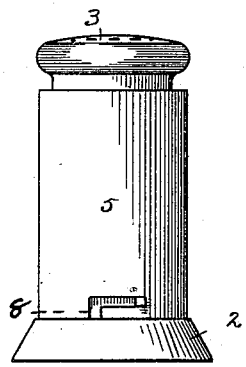
Figure 4:
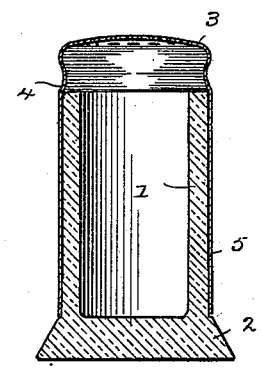

In Fig. 3 I have illustrated a form in which the connection of the case or cover to the body is made by a bayonet joint as at 8, and in Fig. 4 a form in which the connection is by friction alone.

The special shape of the top is not of the essence of my invention except that I preferably provide a shoulder 4 in the neck against which the upper end of the top abuts. In Figs. 1 and 2 I have shown an abrupt shoulder adapted to cover the whole of the upper edge of the body, and in Fig. 4 a shoulder which is engaged by the edge of the top of the body although it does not cover the whole of the top as in the other form. The use of this shoulder renders it impossible for the salt or other condiment to work in between the body and the case or cover. In fact except at the instant of use the condiment does not come in contact with any metal at all but lies in the non-oxidizable body. After using, the salt or pepper all drops back into the body the top being so shaped as not to retain it when the holder is in its normal position.

Having thus described my invention, I claim—

1. A salt or pepper holder consisting of a non-oxidizable body, an independent metallic top and case adapted to inclose the non-oxidizable body, and suitable means for retaining the two parts in engagement.

2. A salt or pepper holder consisting of a non-oxidizable body, an independent metallic top and case adapted to inclose the body and having a shoulder against which the upper edge of the body rests so as to prevent the contents from working in between the cover and the body, and suitable means for retaining the two parts in engagement.

3. A salt or pepper holder consisting of a non-oxidizable body having a screw thread near its lower end, a metallic top, and a case made integral therewith and having a screw thread to engage the thread upon the body, and a shoulder 4 which is engaged by the upper end of the body to prevent the contents from working in between the case and the body.

In testimony whereof I affix my signature in presence of two witnesses.

EDMUND A. PARKER.

Witnesses:
CHARLES H. SAWYER,
BELA CARTER.